(12) United States Patent
Hama et al.

(10) Patent No.: US 6,745,865 B2
(45) Date of Patent: Jun. 8, 2004

(54) ELECTRIC MOTOR APPARATUS

(75) Inventors: Yohei Hama, Tochigi (JP); Akira Fujisaki, Tochigi (JP)

(73) Assignee: Showa Corporation (JP)

( * ) Notice: Subject to any disclaimer, the term of this patent is extended or adjusted under 35 U.S.C. 154(b) by 0 days.

(21) Appl. No.: 10/378,747

(22) Filed: Mar. 4, 2003

(65) Prior Publication Data
US 2003/0209382 A1 Nov. 13, 2003

(30) Foreign Application Priority Data
May 10, 2002 (JP) ........................................ 2002-136155

(51) Int. Cl.⁷ ................................................ H02K 13/00
(52) U.S. Cl. ........................................ 180/444; 310/239
(58) Field of Search ............................... 180/444, 443; 310/71, 239

(56) References Cited

U.S. PATENT DOCUMENTS

| | | | | |
|---|---|---|---|---|
| 3,745,393 A | * | 7/1973 | Spors | 310/239 |
| 4,843,274 A | * | 6/1989 | Paisley | 310/239 |
| 4,845,396 A | * | 7/1989 | Huber | 310/239 |
| 5,248,910 A | * | 9/1993 | Yockey et al. | 310/68 R |
| 5,252,878 A | * | 10/1993 | Spellman et al. | 310/239 |
| 5,440,186 A | * | 8/1995 | Forsell et al. | 310/239 |
| 6,043,576 A | * | 3/2000 | Weber et al. | 310/68 B |
| 6,133,665 A | * | 10/2000 | Prell et al. | 310/239 |
| 6,246,145 B1 | * | 6/2001 | Morimoto et al. | 310/245 |
| 6,271,615 B1 | * | 8/2001 | Morimoto et al. | 310/239 |
| 6,577,030 B2 | * | 6/2003 | Tominaga et al. | 310/68 B |

FOREIGN PATENT DOCUMENTS

| | | |
|---|---|---|
| JP | 984300 | 9/1995 |
| JP | 3207177 | 3/1999 |

* cited by examiner

Primary Examiner—S. Joseph Morano
Assistant Examiner—Tony Winner
(74) Attorney, Agent, or Firm—Drum & Roth

(57) ABSTRACT

In an electric motor, a brush holder is provided with a flange protruding to an outer side in a diametrical direction from an inner diameter position of a yoke, and at least a part of an electric conductor is buried in the flange.

10 Claims, 5 Drawing Sheets

ELECTRIC MOTOR APPARATUS

BACKGROUND OF THE INVENTION

1. Field of the Invention

The present invention relates to an electric motor which is used in an electric power steering apparatus or the like.

2. Description of the Related Art

An electric power steering apparatus, as described in Japanese Patent Application Laid-open No. H9-84300, assists steering effort which a driver applies to a steering shaft, by connecting an assist shaft of a steering gear to a rotation shaft of an electric motor and transmitting a rotation force of the electric motor to the steering gear.

A conventional electric motor, as described in Japanese Patent No. 3207177, is constituted by a tubular yoke, a rotation shaft rotatably provided within the yoke, a stator provided with a magnet fixed within the yoke, a rotor fixed to the rotation shaft and inserted to an inner side of the stator, a brush brought into contact with a commutator of the rotor, a brush holder holding the brush and connected to the yoke, and a plurality of electric conductors buried in the brush holder and feeding an electric current to the brush via a pigtail.

In the conventional art, two electric conductors forming two respective poles (+side and −side) are buried within an inner narrow limited range in a diametrical direction from an inner diameter position of the yoke in the brush holder. This structure results in difficulty of arrangement of the electric conductors.

In order to arrange two electric conductors on one surface without being in contact with each other in the interior of the brush holder, it is necessary to prepare a wide burying range, and it is necessary to increase an inner diameter of the yoke, so that an outer diameter of the electric motor is increased. In order to prevent the electric motor from becoming undesirably large, it is necessary to shift surfaces on which two electric conductors are arranged from each other, so that the electric conductors are formed in a stereoscopically complex shape, and further, a bending process would be required. Accordingly, the cost becomes high.

SUMMARY OF THE INVENTION

An object of the present invention is to improve an arranging property of the electric conductors buried in the interior of the brush holder without increasing the outer diameter of the electric motor.

According to the present invention, there is disclosed an electric motor having a tubular yoke. A rotation shaft is rotatably provided within the yoke, and a stator is provided with a magnet fixed within the yoke. A rotor is fixed to the rotation shaft and is inserted to an inner side of the stator. A brush is brought into contact with a commutator of the rotor. A brush holder is arranged to hold the brush and is connected to the yoke. A plurality of electric conductors are buried in the brush holder and are arranged to feed an electric current to the brush.

A protruding portion protruding to an outer side in a diametrical direction from an inner diameter position of the yoke is provided in the brush holder, and at least a portion of the electric conductor is buried in the protruding portion.

BRIEF DESCRIPTION OF THE DRAWINGS

The present invention will be more fully understood from the detailed description given below and from the accompanying drawings which should not be taken to be a limitation of the invention, but are for explanation and understanding only.

DESCRIPTION OF THE PREFERRED EMBODIMENTS

Figure 1:
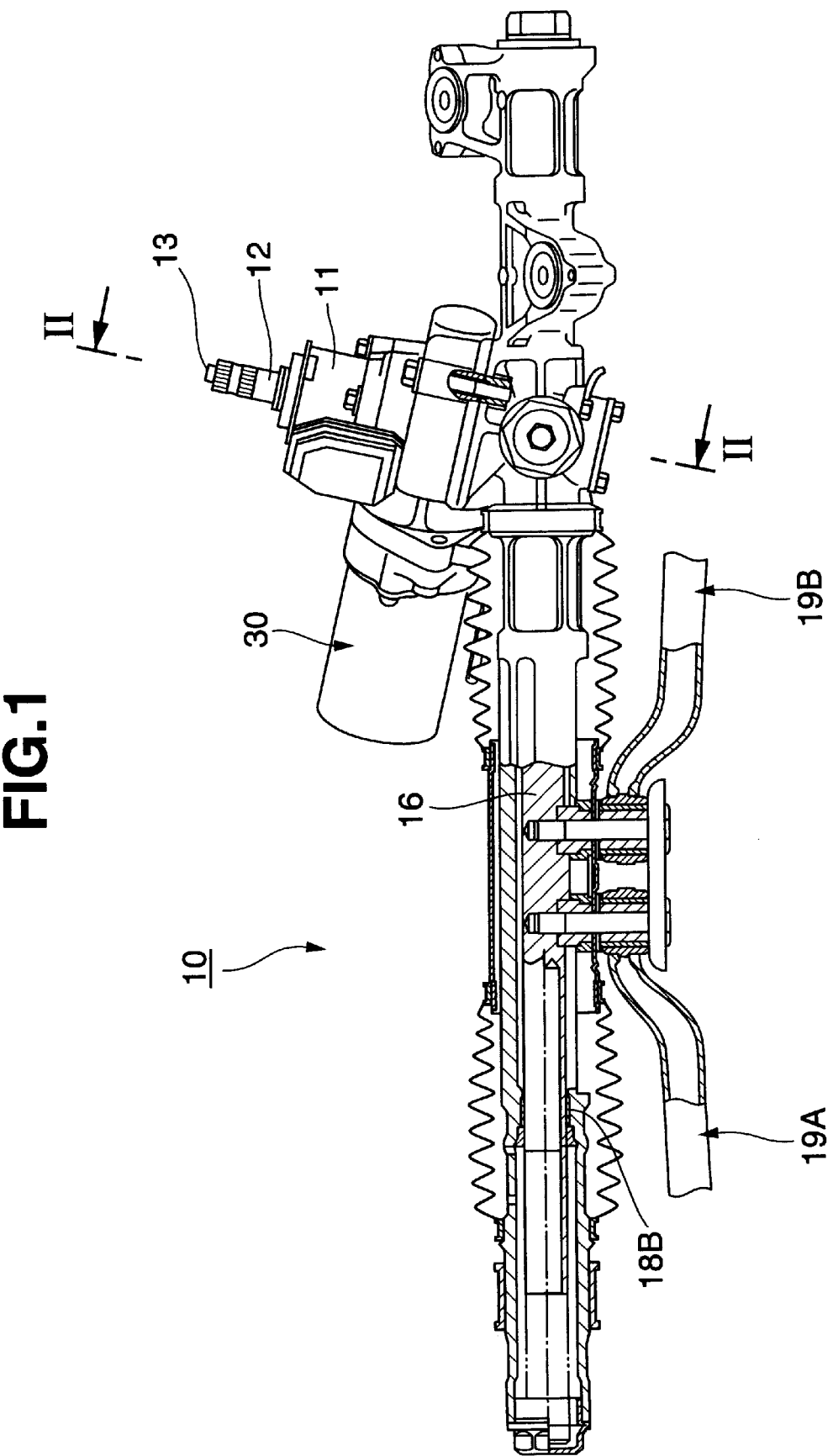
FIG. 1 is a front elevational view showing an electric power steering apparatus in a partly breaking manner.
Figure 2:
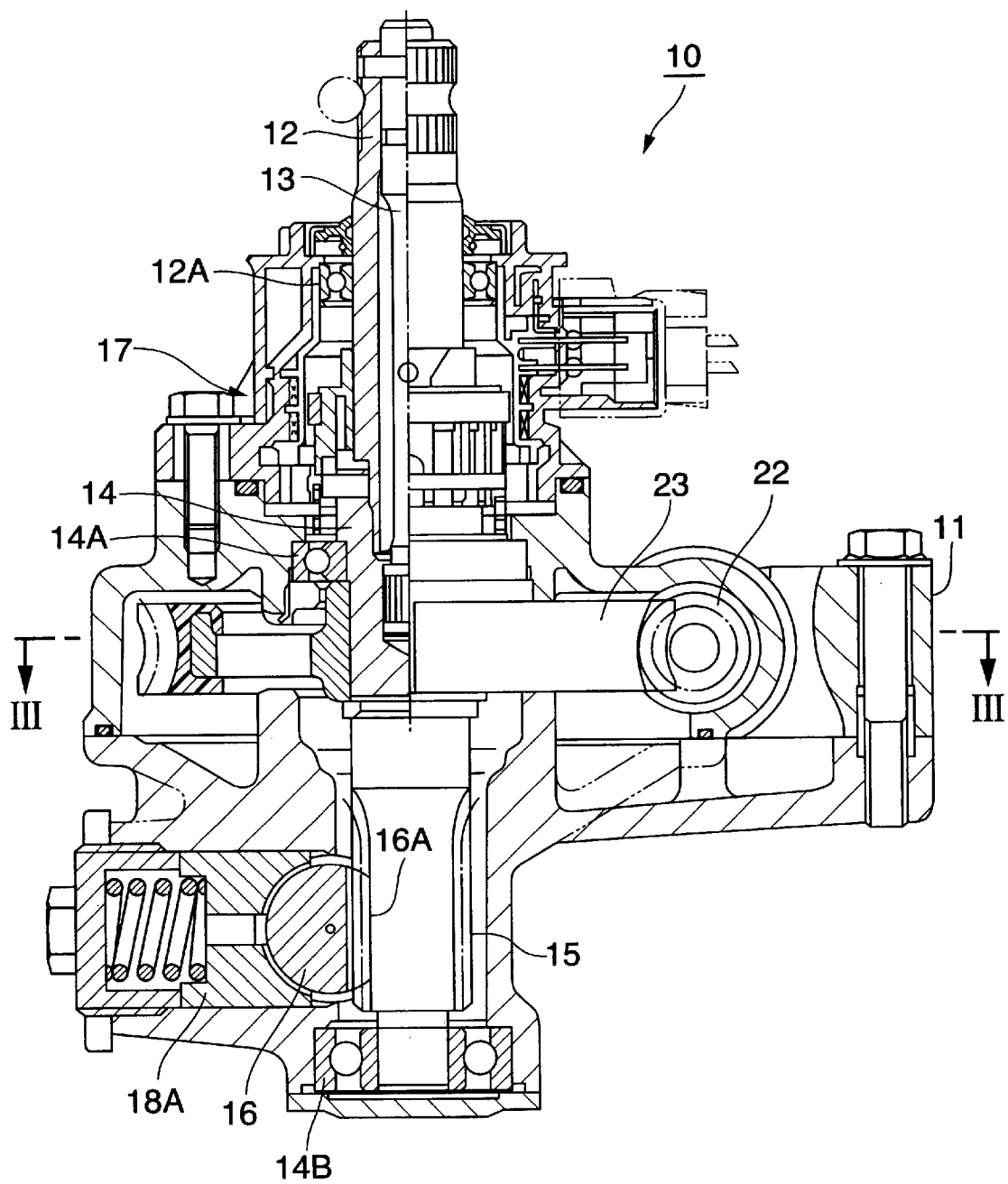
FIG. 2 is a cross sectional view along a line II—II in FIG. 1.

An electric power steering apparatus 10 has an aluminum alloy gear housing 11 fixed to a vehicle body frame or the like, as shown in FIGS. 1 and 2. A pinion shaft 14 is connected to a steering shaft 12 to which a steering wheel is connected, via a torsion bar 13. A pinion 15 is provided on this pinion shaft 14, and a rack shaft 16 provided with a rack 16A engaging with this pinion 15 is supported in cooperation with the gear housing 11 so as to freely move laterally. A steering torque detecting apparatus 17 is provided between the steering shaft 12 and the pinion shaft 14. In this embodiment, the steering shaft 12 and the pinion shaft 14 are supported in cooperation with the gear housing 11 via bearings 12A, 14A and 14B. One end of the rack shaft 16 is slidably supported to a rack guide 18A, and the other end of the rack shaft 16 is slidably supported to a bearing 18B. Left and right tie rods 19A and 19B are connected to a middle portion of the rack shaft 16.

Figure 3:
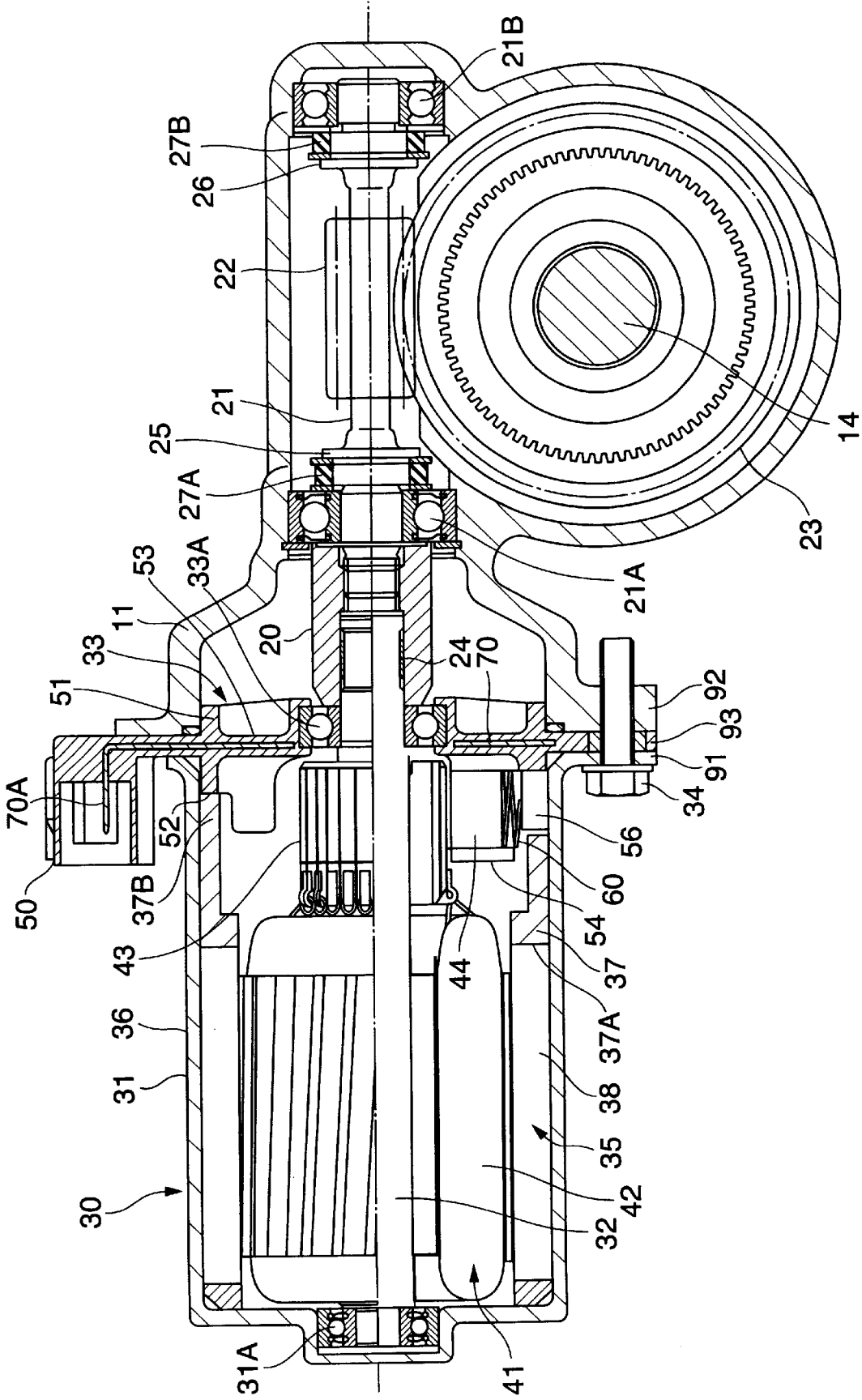
FIG. 3 is a cross sectional view along a line III—III in FIG. 2.

A motor case 31 of an electric motor 30 is fixed to the gear housing 11, as shown in FIG. 3. An assist shaft 21 is connected to a rotation shaft 32 of the electric motor 30 via a connection body 20. The assist shaft 21 is supported at both ends to the gear housing 11 by bearings 21A and 21B such as ball bearings or the like. A worm gear 22 is integrally provided in a middle portion of the assist shaft 21, and a worm wheel 23 engaging with the worm gear 22 is fixed to a middle portion of the pinion shaft 14. Torque generated in the electric motor 30 is applied to the rack shaft 16 via engagement between the worm gear 22 and the worm wheel 23 and engagement between the pinion 15 and the rack 16A, so as to form a steering assist force, thereby assisting the steering effort which the driver applies to the steering shaft 12.

The rotation shaft 32 of the electric motor 30 is inserted to the interior of the connection body 20. A torque limiter 24 slipping by a predetermined limit torque is interposed between an inner periphery of the connection body 20 and an outer periphery of the rotation shaft 32. The assist shaft 21 is inserted to the interior of the connection body 20, and is spline connected to the connection body 20. The torque limiter 24 is constituted by an elastic ring such as a spring resin or the like which is pressure-fitted between the inner periphery of the connection body 20 and the outer periphery of the rotation shaft 32 so as to be elastically supported in a diametrical direction. In a normally torque range of the electric power steering apparatus 10 (a torque smaller than a limit torque), the connection body 20 and the rotation shaft 32 are kept in connection by the elastic force of the torque limiter 24 without slip. Alternately, there may be circumstances of an impact torque (a torque equal to or more than the limit torque) where an inertia toque of the electric motor 30 becomes more than the elastic force of the torque limiter 24. This may occur when a stroke of the rack shaft 16 is suddenly stopped, such as when a tire runs on a curb during steering operation, or the like. Under these conditions, the rotation shaft 32 is slipped against the connection body 20, and a function is carried out such that the torque of the electric motor 30 is not transmitted to a side of the connection body 20.

The assist shaft 21 is elastically supported to the housing 11 in both direction along an axial direction, and can absorb a high level of thrust applied to the assist shaft 21, such as when the electric power steering apparatus 10 is reverse driven, the tire runs on a curb, or the like. In particular, outer wheels of the bearings 21A and 21B for the assist shaft 21 are fixed to the gear housing 11, and the assist shaft 21 is loosely fitted to inner wheels of the bearings 21A and 21B. Flanges 25 and 26 are provided in the assist shaft 21, a precompressed elastic deformation member 27A is interposed between the flange 25 and the inner wheel of the bearing 21A, and a precompressed elastic deformation device 27B is interposed between the flange 26 and the inner wheel of the bearing 21B. That is, the elastic deformation members 27A and 27B are assembled with a fixed precompression amount (a fixed impact damping performance) when installed in the assist shaft 21, and consequently they support the assist shaft 21 elastically in both directions along the axial direction.

One embodiment, the electric motor 30 is constructed in the following manner.

The electric motor 30 is constructed such that the motor case 31 and a brush holder 33 are fixed to the gear housing 11 by bolts 34. The rotation shaft 32 is supported by bearings 31A and 33A constituted by ball bearings or the like and provided respectively in the motor case 31 and the brush holder 33. The electric motor 30 has a stator 35 which comprises a tubular yoke 36 constituting the motor yoke 31 and formed by a magnetic material such as a steel or the like, and a magnet holder 37 forming magnet receiving sections 37A at a plurality of peripheral positions on an inner periphery of the yoke 36 and constituted by a tubular body formed by an insulative resin material. Magnets 38 are received in the magnet receiving sections 37A of the magnet holder 37 so as to be positioned and held, and a magnet cover held in an engaging manner in an inner side of the magnet 38 is positioned and held to the magnet holder 37 and is formed by an ultra-thin sheet made of a nonmagnetic material.

The electric motor 30 has a rotor 41 which is inserted to an inner side of the stator 35 and which is fixed to the rotation shaft 32. The rotor 41 is constituted by an armature core 42 and a commutator 43 which are provided in an outer periphery of the rotation shaft 32.

The electric motor 30 has a plurality of (for example, four) brushes 44 (44A to 44D) brought into contact with the commutator 43 of the rotor 41, the brush holder 33 holding a brush 44, and an electric current feeding connector 50 connected to the brush 44.

In the electric motor 30, when electric current is fed to the armature core 42 from the brush 44 via the commutator 43 of the rotor 41, a line of magnetic force of the armature core 42 cuts a magnetic field generated in the magnet 38 of the stator 35, causing the rotor 41 to rotate.

Figure 4:
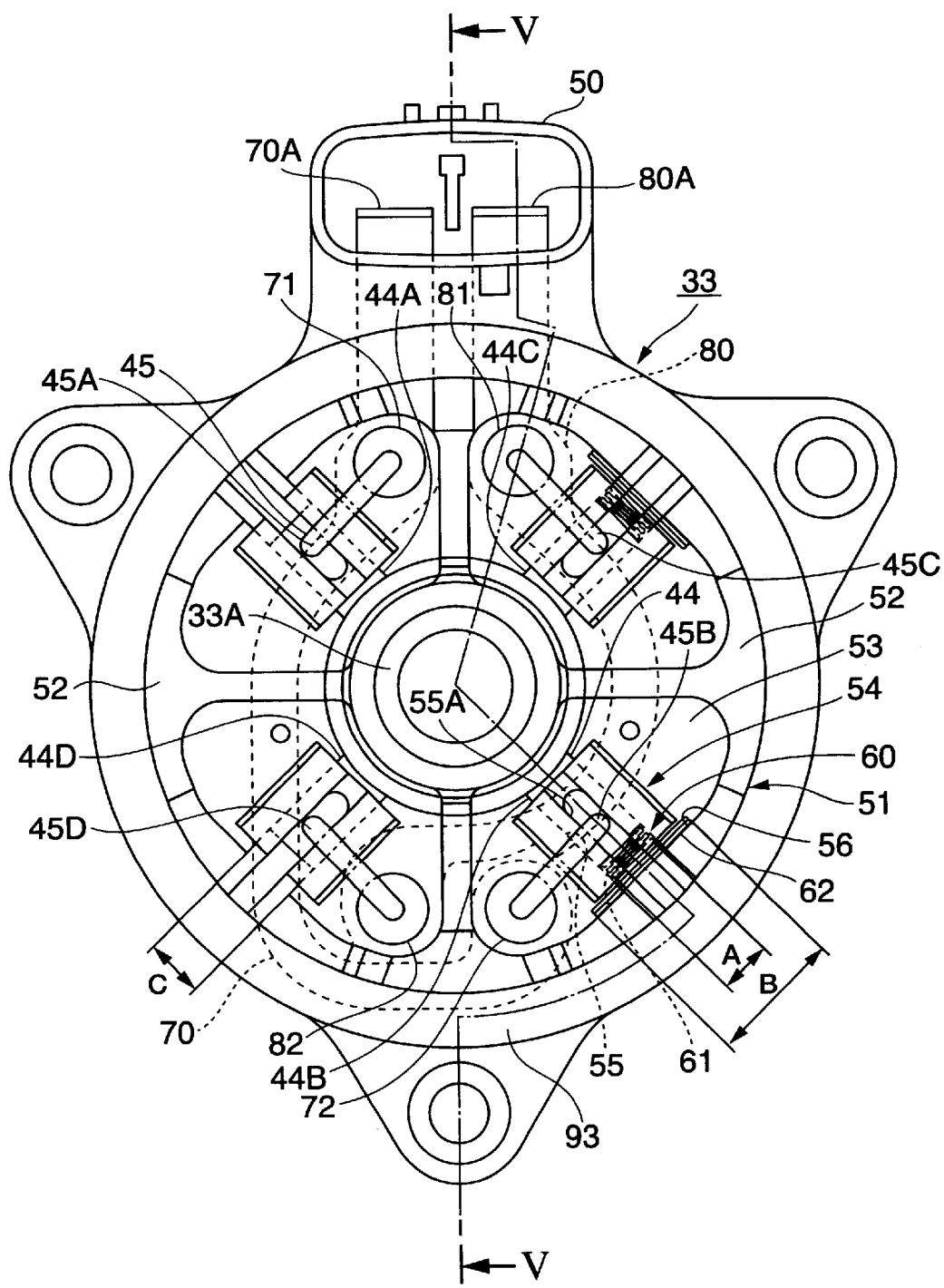
FIG. 4 is a front elevational view showing a brush holder.
Figure 5:
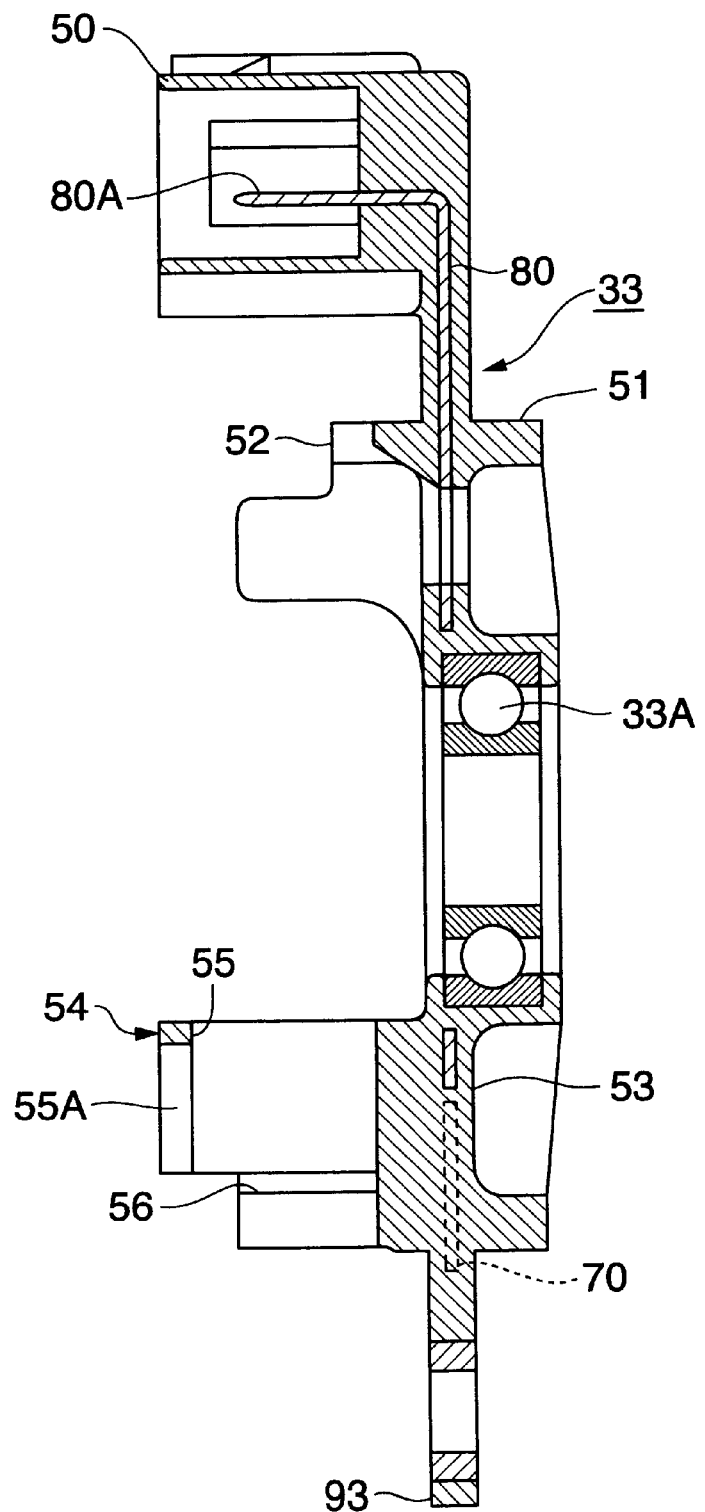
FIG. 5 is a cross sectional view along a line V—V in FIG. 4.

Accordingly, the brush holder 33 is structured as shown in FIGS. 4 and 5.

The brush holder 33 is an injection molded body integrally forming the electric current feeding connector 50 and being made of insulative resin material. The brush holder 33 is structured such that the motor case 31 is faucet connected to one end side of a short cylinder body 51. The gear housing 11 is faucet connected to the other end side of the short cylinder body 51. Three elements comprising the motor case 31, the brush holder 33 and the gear housing 11 can be coaxially connected. The brush holder 33 prevents the brush 44 held by the brush holder 33 from being displaced with respect to the magnet 38 of the stator 35 positioned by the magnet holder 37, by means of an engagement recess portion 52 at a specific position in a peripheral direction in a side of one end of the short cylinder body 51, and engaging an engagement convex portion 37B of the magnet holder 37 with this engagement recess portion 52. Therefore, brush holder 33 prevents rotation performance of the electric motor 30 from differing between a forward rotating direction and a backward rotating direction.

The brush holder 33 is provided with a partition wall 53 in an interior of the short cylinder body 51, and is provided with the bearing 33A mentioned above constituted by the ball bearing or the like for the rotation shaft 32 by integral insert molding.

The brush holder 33 is provided with brush holding portions 54 at a plurality of positions (for example, four positions) in a circumferential direction of an end face facing the commutator 43 in the partition wall 53. Through holes 55 for slidably inserting the brushes 44 are formed in the respective brush holding portion 54. The through hole 55 receives the brush 44 in a side of the commutator 43 in a slidably protruding manner, and positions and holds the brush 44. The brush holder 33 back-up holder of the brush 44 inserted to the through hole 55. A brush spring is provided 60 which protrudes the brush 44 from a leading end opening of the through hole 55 so as to bring the brush 44 into pressure contact with the commutator 43 from a diametrical direction of the rotation shaft 32.

The brush holder 33 is integrally provided with spring receiving portions 56 and 56 arranged in both sides of a rear face of the brush holding portion 54. The brush holder 33 can accommodate a main body portion 61 having a narrow width A of the brush spring 60 into the through hole 55, and can engage a support seat 62 having a wide width B with the spring receiving portion 56. Both of the spring receiving portions 56 and 56 are arranged in an outer side of a projection area of the through hole 55 so as to have a gap C preventing an interference with a hollowing area in a core mold forming the through hole 55. The brush holding portion 54 is provided with a long hole portion 55A allowing pigtails 45 (45A to 45D) of the brush 44 to move, in a ceiling portion of the through hole 55.

In this embodiment, FIG. 4 shows an assembling process state in which the brush 44 and the brush spring 60 are assembled in two brush holding portions 54, and only the brushes 44 are assembled in the remaining two brush holding portions 54, in four brush holding portions 54.

The brush holder 33 is structured, as mentioned above, such that the electric current feeding connector 50 is integrally formed in an outer side of the short cylinder body 51, and two flat electric conductors (bas bars) 70 and 80 respectively forming two poles (+side and −side) are buried so as to extend between the partition wall 53 and the electric current feeding connector 50 according to an insert molding. An electric current feeding terminal 70A of the electric conductor 70 is insert molded so as to be arranged in an interior of the electric current feeding connector 50, and the pigtails 45A and 45B connected to two brushes 44A and 44B are respectively connected to connection portions 71 and 72 of the electric conductor 70. An electric current feeding terminal 80A of the electric conductor 80 is also insert molded so as to be arranged in an interior of the electric current feeding connector 50, and the pigtails 45C and 45D connected to two brushes 44C and 44D are respectively connected to connection portions 81 and 82 of the electric conductor 80.

In one embodiment, in the electric power steering apparatus 10, a flange 91 is provided in the yoke 36 constituting the motor case 31, a flange 92 is provided in the gear housing 11, and a flange 93 (a protruding portion) is provided in the brush holder 33. The flange 93 is clamped between the flange 91 and the flange 92 by the bolt 34 mentioned above. The flange 93 of the brush holder 33 is provided in an outer periphery of the short cylinder body 51. It exhibits a protruding portion, according to the present invention, protruding to an outer side in a diametrical direction from an inner diameter position of the yoke 36. Also, the flange 93 buries a part of the electric conductor 70. The electric conductor 70 and the electric conductor 80 are mounted on one flat surface in the interior of the brush holder 33.

According to the present embodiment, the following advantages can be obtained.

(1) The electric conductor 70 is buried in the flange 93 corresponding to the protruding portion protruding to the outer side from the inner diameter position of the yoke 36 in the brush holder 33. Thus, it is possible to expand a burying space of the electric conductor 70 in the brush holder 33 up to the flange 93 mentioned above without expanding the inner diameter of the yoke 36. It is possible to enlarge an arranging space of the electric conductors 70 and 80 without increasing the outer diameter of the electric motor 30. It is therefore possible to improve a the handling properties.

(2) According to the effect (1) mentioned above, it is possible to arrange two electric conductors 70 and 80 on one surface in the interior of the brush holder 33, without increasing the outer diameter of the electric motor 30. It is also possible to make it unnecessary to carry out a bending process without making the shape of the electric conductors 70 and 80 stereoscopically complex, with the result that a lower cost can be achieved.

(3) A part of the electric conductor 70 is buried in the flange 93 of the brush holder 33 which is clamped between the flange 91 of the yoke 36 in the electric motor 30 and the flange 92 of the gear housing 11. Accordingly, it is possible to effectively utilize a portion between the connection spaces having the large diameters in the flange 91 of the yoke 36 and the flange 92 of the gear housing 11, as the burying space of the electric conductor 70 in the effect (1) is expanded in the brush holder 33, and the assembling characteristics are improved.

In this case, the structure may be made such that not only the electric conductor 70 but also the electric conductor 80 may be buried in the flange 93 of the brush holder 33.

As heretofore explained, embodiments of the present invention have been described in detail with reference to the drawings. However, the specific configurations of the present invention are not limited to the embodiments, but those having a modification of the design within the range of the present invention are also included in the present invention. For example, the protruding portion according to the present invention does not always extend over the entire periphery of the brush holder. Further, the protruding portion according to the present invention is not always clamped between the flange of the yoke and the gear housing.

The brush according to the present invention may be brought into pressure contact with the commutator in an opposing manner in a direction along the axial direction of the rotation shaft 32. The electric conductor according to the present invention is not always formed in a flat shape, but may be formed in other cross sectional shapes such as a rod shape, and the like.

As described above, according to the present invention, it is possible to improve a handling property of the electric conductor buried in the interior of the brush holder without increasing the outer diameter of the electric motor.

Although the invention has been illustrated and described with respect to several exemplary embodiments thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be embodied within a scope encompassed and equivalents thereof with respect to the features set out in the appended claims.

What is claimed is:

1. An electric motor comprising:

a tubular yoke;

a rotation shaft rotatably provided within the yoke;

a stator provided with a magnet fixed within the yoke;

a rotor fixed to the rotation shaft and inserted to an inner side of the stator;

a brush brought into contact with a commutator of the rotor;

a brush holder holding the brush and connected to the yoke; and a plurality of electric conductors buried in the brush holder and feeding an electric current to the brush, wherein a protruding portion protruding to an outer side in a diametrical direction from an inner diameter position of the yoke is provided in the brush holder, and at least a portion of the electric conductor is buried in the protruding portion.

2. An electric motor according to claim 1, wherein the plurality of electric conductors are arranged on a surface of the brush holder.

3. An electric power steering apparatus including an electric motor according to claim 1 in which the rotation shaft is connected to an assist shaft supported to a gear housing, wherein the protruding portion of the brush holder is formed as a flange, and the flange of the brush holder is held between the flange of the yoke in the electric motor and a connection portion of the gear housing.

4. An electric power steering apparatus in which the rotation shaft of the electric motor according to claim 2 is connected to an assist shaft supported to a gear housing, wherein the protruding portion of the brush holder is formed as a flange, and the flange of the brush holder is held between the flange of the yoke in the electric motor and a connection portion of the gear housing.

5. An electric power steering apparatus including an electric motor according to claim 3, wherein the brush holder has a short cylinder body protruding to both a side of the electric motor and a side of the gear housing, a motor case of the electric motor is faucet connected to a first end side of the short cylinder body, and the gear housing is faucet connected to a second end side of the short cylinder body, wherein three elements comprising the motor case, the brush holder and the gear housing are coaxially connected.

6. An electric power steering apparatus including an electric motor according to claim 4, wherein the brush holder has a short cylinder body protruding to both a side of the electric motor and a side of the gear housing, a motor case of the electric motor is faucet connected to a first end side of the short cylinder body, and the gear housing is faucet connected to a second end side of the short cylinder body, wherein three elements comprising the motor case, the brush holder and the gear housing are coaxially connected.

7. An electric power steering apparatus including an electric motor according to claim 5, wherein the brush holder has an engagement recess portion at a specific position in a peripheral direction in the first end side of the short cylinder body, and is constructed to engage an engagement convex portion of a magnet holder holding a magnet with an engagement recess portion.

8. An electric power steering apparatus including an electric motor according to claim 6, wherein the brush holder has an engagement recess portion at a specific position in a peripheral direction in the first end side of the short cylinder body, and is constructed to engages an engagement convex portion of a magnet holder holding a magnet with an engagement recess portion.

9. An electric power steering apparatus including an electric motor according to claim 5, wherein the brush holder is provided with a partition wall in an interior of the short cylinder body, and has an integrally insert molded bearing for the rotation shaft in a center portion of the partition wall.

10. An electric power steering apparatus including an electric motor according to claim 6, wherein the brush holder is provided with a partition wall in an interior of the short cylinder body, and has an integrally insert molded bearing for the rotation shaft in a center portion of the partition wall.

* * * * *